United States Patent
Guo

(10) Patent No.: US 12,238,816 B2
(45) Date of Patent: Feb. 25, 2025

(54) WiFi STATION AND ASSOCIATED PASSIVE SCANNING METHOD

(71) Applicant: REALTEK SEMICONDUCTOR CORPORATION, Hsinchu (TW)

(72) Inventor: Mingzhi Guo, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 418 days.

(21) Appl. No.: 17/738,012

(22) Filed: May 6, 2022

(65) Prior Publication Data
US 2023/0049701 A1    Feb. 16, 2023

(30) Foreign Application Priority Data
Aug. 16, 2021   (CN) .......................... 202110935307.0

(51) Int. Cl.
*H04W 8/00* (2009.01)
*H04L 5/00* (2006.01)
*H04W 84/12* (2009.01)

(52) U.S. Cl.
CPC ........... *H04W 8/005* (2013.01); *H04L 5/0092* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 11,968,065 B1* | 4/2024 | Cheon | H04B 1/1018 |
| 2007/0207823 A1* | 9/2007 | van Nee | H04W 72/20 |
| | | | 455/509 |
| 2010/0184395 A1 | 7/2010 | Bagge et al. | |
| 2010/0240333 A1* | 9/2010 | Tang | H04W 48/16 |
| | | | 455/161.1 |
| 2013/0286937 A1 | 10/2013 | Liu et al. | |
| 2018/0368057 A1* | 12/2018 | Asterjadhi | H04W 48/10 |
| 2019/0327628 A1* | 10/2019 | Jain | H04W 24/10 |
| 2020/0052530 A1* | 2/2020 | Adachi | H02J 50/80 |
| 2021/0320831 A1* | 10/2021 | Park | H04L 27/2621 |

FOREIGN PATENT DOCUMENTS

EP    2615871 A1    7/2013

* cited by examiner

*Primary Examiner* — Lonnie V Sweet
(74) *Attorney, Agent, or Firm* — WPAT, P.C.; Anthony King

(57) ABSTRACT

The application discloses a WiFi station and an associated passive scanning method, including receiving an RF signal within a specific frequency band to generate a baseband signal; detecting whether the baseband signal includes a first preamble corresponding to a first channel and generating a first detecting result accordingly; detecting whether the baseband signal includes a second preamble corresponding to a second channel and generating a second detecting result accordingly; according to the first detecting result and the second detecting result, determining to use a center frequency of the first channel or a center frequency of the second channel to perform frequency shifting on the baseband signal, to generate the frequency-shifted baseband signal.

20 Claims, 6 Drawing Sheets

WiFi STATION AND ASSOCIATED PASSIVE SCANNING METHOD

CROSS-REFERENCE TO RELATED APPLICATIONS

This application claims priority of China application No. 202110935307.0 filed on Aug. 16, 2021, which is hereby incorporated herein by reference in its entirety.

TECHNICAL FIELD

The present application relates to wireless communications, particularly to a WiFi station and an associated passive scanning method.

BACKGROUND

According to the current wireless communication specification, when a device connects to the network via WiFi, it needs to be scanned to collect information about each transmission channel as defined in the specification. In the present application, the scanning method is improved to reduce the time required for scanning and speed up the device connection to enhance the user experience.

SUMMARY OF THE INVENTION

The present application provides a WiFi station, including: a receiving circuit, configured to receive a radio frequency (RF) signal within a specific frequency band to generate a baseband signal during passive scanning, wherein a range of the specific frequency band includes a range of a first channel and a range of a second channel; a first preamble detection circuit, configured to detect whether the baseband signal has a first preamble corresponding to the first channel and output a first detection result accordingly; a second preamble detection circuit, configured to detect whether the baseband signal has a second preamble corresponding to the second channel and output a second detection result accordingly; a frequency-shifting circuit, configured to determine to perform frequency shifting on the baseband signal based on a center frequency of the first channel or a center frequency of the second channel, according to the first detection result and the second detection result, and generate a frequency-shifted baseband signal; and a processing circuit, wherein when the WiFi station remains in the original specific frequency band for a specific period, the processing circuit updates the specific frequency band.

The present application provides a method for passively scanning a WiFi station, including: receiving a radio frequency (RF) signal within a specific frequency band to generate a baseband signal, wherein the range of the specific frequency band includes a range of a first channel and a range of a second channel; detecting whether the baseband signal has a first preamble corresponding to the first channel and outputting a first detection result accordingly; detecting whether the baseband signal has a second preamble corresponding to the second channel and outputting a second detection result accordingly; determining to perform frequency shift on the baseband signal based on a center frequency of the first channel or a center frequency of the second channel frequency, according to the first detection result and the second detection result, and generating the frequency-shifted baseband signal; and updating the specific frequency band when the WiFi station remains in the original specific frequency band for a specific period.

This application reduces the total time required to complete passive scanning at WiFi stations in compliance with 2.4G/5G specifications.

BRIEF DESCRIPTION OF THE DRAWINGS

Aspects of the present disclosure are best understood from the following detailed description when read with the accompanying drawings. It is noted that, in accordance with the standard practice in the industry, various features are not drawn to scale. In fact, the dimensions of some features may be arbitrarily increased or reduced for clarity of discussion.

DETAILED DESCRIPTION

Figure 1:
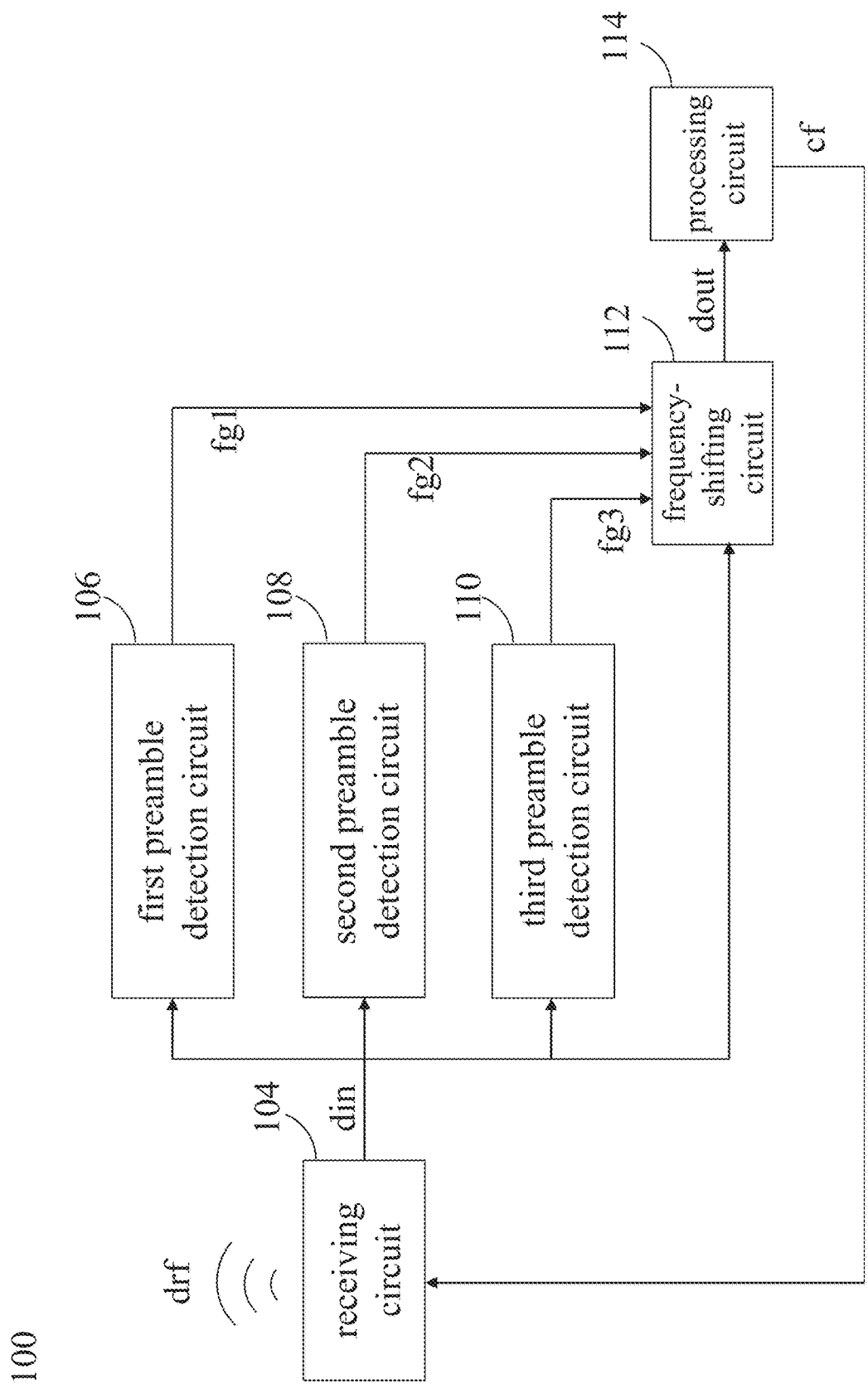
FIG. 1 is a schematic diagram illustrating a 2.4G WiFi station according to embodiments of the present disclosure.

FIG. 1 is a schematic diagram illustrating a 2.4G WiFi station (STA) 100 according to embodiments of the present disclosure. In this embodiment, a receiving circuit 104 is configured to receive a 2.4G radio frequency (RF) signal drf and generate a baseband signal din to a subsequent baseband circuit, including a first preamble detection circuit 106, a second preamble detection circuit 108, a third preamble detection circuit 110, and a frequency-shifting circuit 112. In the present embodiment, the receiving circuit 104 can include an analog circuit and a mixed-signal circuit; the baseband circuits are digital circuits; and the processing circuit 114 can be implemented using a digital circuit, firmware or software. The present application is specifically directed to the improvement of methods for performing passive scanning of Wifi station 100.

Figure 2:
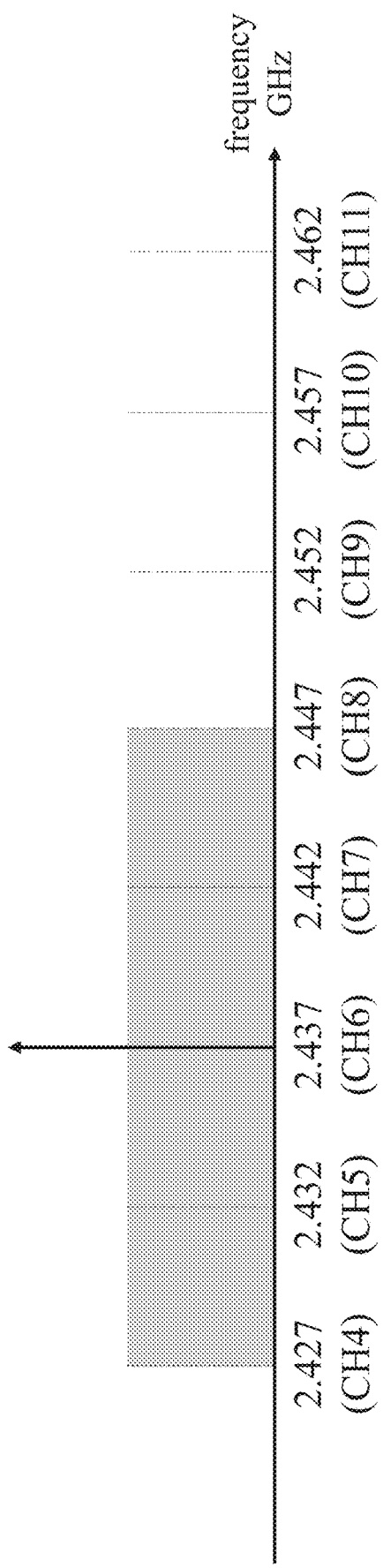
FIG. 2 is a schematic diagram illustrating a band for performing passive scanning of the WiFi station shown in FIG. 1.

According to the 2.4G specification, the center frequency of each channel is spaced apart by a 5 MHz interval; for example, in FIG. 2, the center frequency of CH4 to CH11 starts from 2.427 GHz and is increased to 2.462 GHz at 5 MHz intervals. When the 2.4G WiFi station 100 performs the passive scanning, beacons sent by an access point (AP) in each channel are detected to receive information about each channel. According to the 2.4G specification, the bandwidth of WiFi Station 100 is limited to 20 MHz, which is much smaller than the overall channel distribution range, so the beacons for each channel can only be detected separately.

In the present embodiment, the receiving circuit 104 receives the RE signal drf in the 20 MHz bandwidth to generate the baseband signal din; for example, in the scenario of FIG. 2, the frequency range received by the receiving circuit 104 is between 2.427 GHz and 2.447 GHz (labeled as the gray area); that is, the center frequency of the receiving circuit 104 is 2,437 GHz, corresponding to CH6.

As could be seen in FIG. 2, the bandwidth of the receiving circuit 104 further covers CH5 and CH7. Hence, the present application uses the first preamble detection circuit 106, the second preamble detection circuit 108 and the third preamble detection circuit 110 to respectively monitor CH5, CH6 and CH7, and once a beacon corresponding to CH5, CH6 or CH7 is found, the frequency-shifting circuit 112 is notified to perform corresponding band shifting on the baseband signal din to generate a frequency-shifted baseband signal dout, so that the information in the beacon can be better readout by subsequent circuits.

Specifically, the first preamble detection circuit 106 continuously detects whether the beacon in the baseband signal din carries a preamble corresponding to CH5. For example, the first preamble detection circuit 106 uses a set of Barker code corresponding to CH5 to perform cross-correlation computation with the preamble in each beacon carried in the baseband signal din and normalizes the results of the cross-correlation computation according to the signal energy of the current baseband signal din. If a value of the normalized cross-correlation computation is greater than a preset threshold, then it is determined that the beacon corresponds to CH5, and the first preamble detection circuit 106 should immediately notify the frequency-shifting circuit 112 via a signal fg1, so that the frequency-shifting circuit 112 performs −5 MHz band shifting computation on the baseband signal din (shifted down from 2.437 GHz by 5 MHz to 2.432 GHz) to receive data payload in the beacon corresponding to CH5, wherein the frequency-shifting circuit 112 continues the −5 MHz band shifting computation at least until the beacon has been received completely. In contrast, if the beacon does not correspond to CH5, then the frequency-shifting circuit 112 will not be notified to perform −5 MHz band shifting computation.

It should be noted that although the receiving circuit 104 uses 2.437 GHz as the center frequency, the bandwidth of the receiving circuit 104 also covers CH5 and CH7, and the signal quality required for the detection of preamble is sufficient. So the present application uses the WiFi station 100 to simultaneously detect whether a beacon corresponding to any of CH5, CH6, and CH7 is received, and once a beacon corresponding to one of them is detected, the frequency-shifting circuit 112 performs corresponding band shifting computation on the baseband signal din accordingly to improve the signal-to-noise ratio of the data fields in the beacon.

Similarly, the second preamble detection circuit 108 uses a set of Barker code corresponding to CH6 to determine whether each beacon corresponds to CH6. If yes, then the frequency-shifting circuit 112 is immediately notified via a signal fg2, and since the receiving circuit 104 receives the RF signal drf using the center frequency of CH6, the frequency-shifting circuit 112 does not perform band shifting computation on the baseband signal din (i.e., the band shifting is 0), and will directly output the baseband signal as the frequency-shifted output signal dout. Further, the third preamble detection circuit 110 uses a set of Barker code corresponding to CH7 to determine whether each beacon corresponds to CH7. If yes, then the frequency-shifting circuit 112 is immediately notified via a signal fg3, and the frequency-shifting circuit 112 performs 5 MHz band shifting computation on the baseband signal din (shifted up from 2.437 GHz by 5 MHz to 2.442 GHz) to receive the data payload in the beacon corresponding to CH7, and the frequency-shifting circuit 112 continues the 5 MHz band shifting computation at least until the beacon is received completely.

Figure 3:
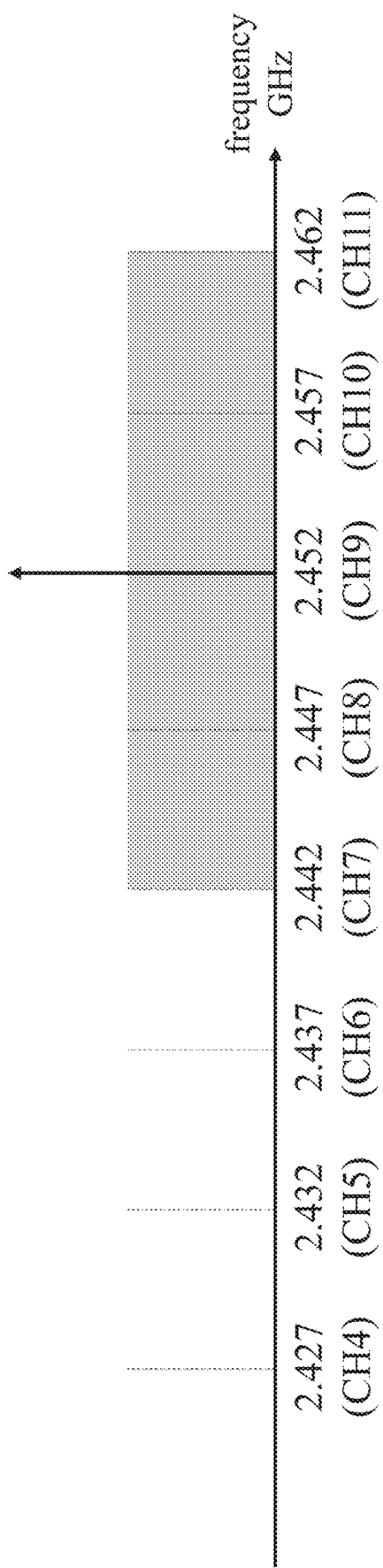
FIG. 3 is a schematic diagram illustrating another band for performing passive scanning of the WiFi station shown in FIG. 1.

The processing circuit 114 uses a control signal cf to control the receiving circuit 104 to use 2.437 GHz as the center frequency to perform the passive scanning, which lasts for a specific period and then hops to the next band. As shown in FIG. 3, because the passive scanning of CH5, CH6 and CH7 has been completed, during the next specific period, the processing circuit 114 controls the center frequency of the WiFi station 100 to shift up by 15 MHz to 2.452 GHz (the center frequency of CH9), so as to update the 20 MHz band range (labeled as a gray area) of the next specific period, so that it covers CH8, CH9 and CH10, to simultaneously detect the beacons of CH8, CH9 and CH10. That is, compared to the approach wherein the center frequency for scan is only moved by the distance of one channel (5 MHz) during each specific period, the present application can speed up the passive scanning by moving a distance of multiple channels each time.

It should be noted that the WiFi station 100 can simultaneously monitor beacons from three channels during a specific period, so that the time for the overall passive scanning can be reduced to as few as one-third of the original time. However, in certain embodiments, it is feasible to simultaneously monitor two channels. Moreover, the order for performing passive scanning of the 14 channels is not particularly limited, and after all channels are subject to the passive scanning for the specific period, the processing circuit 114 stops updating the 20 MHz band range of the WiFi station 100. Further, the specific period can be 100 ms that is in compliance with the 2.4G specification or integer multiples thereof.

Figure 4:
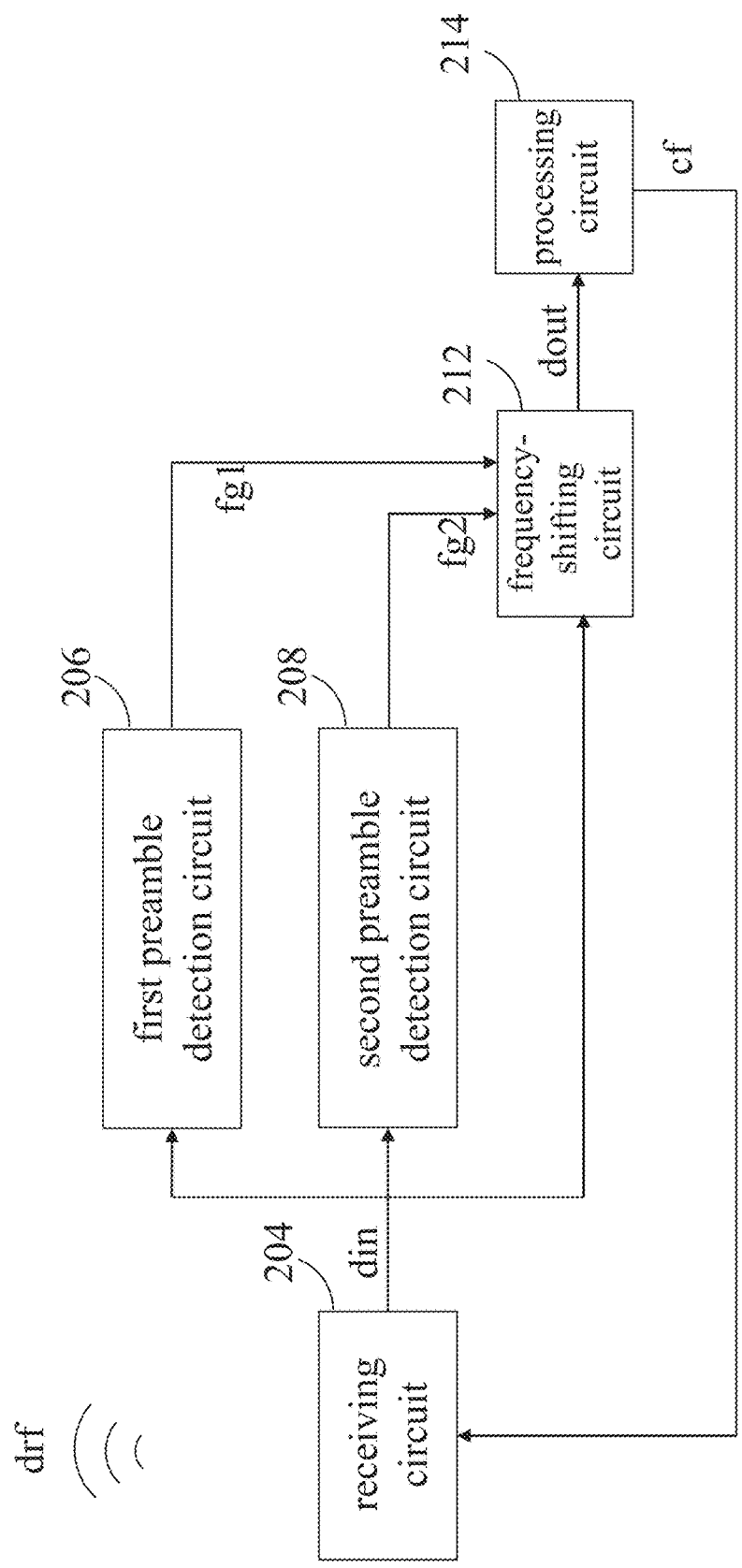
FIG. 4 is a schematic diagram illustrating a 5G WiFi station according to embodiments of the present disclosure.

FIG. 4 is a schematic diagram illustrating a 5G WiFi station 200 according to embodiments of the present disclosure. Since the channel band and receiving band according to 5G specification differ from those according to 2.4G specification, the infrastructures of the WiFi station 200 and the WiFi station 100 are different. In this embodiment, a receiving circuit 204 is configured to receive a 5G RF signal drf and generate a baseband signal din to a subsequent baseband circuit, including a first preamble detection circuit 206, a second preamble detection circuit 208, and a frequency-shifting circuit 212. In the present embodiment, the receiving circuit 204 can include an analog circuit and a mixed-signal circuit; the baseband circuits are digital circuits; and the processing circuit 214 can be implemented using a digital circuit, firmware or software.

Figure 5:
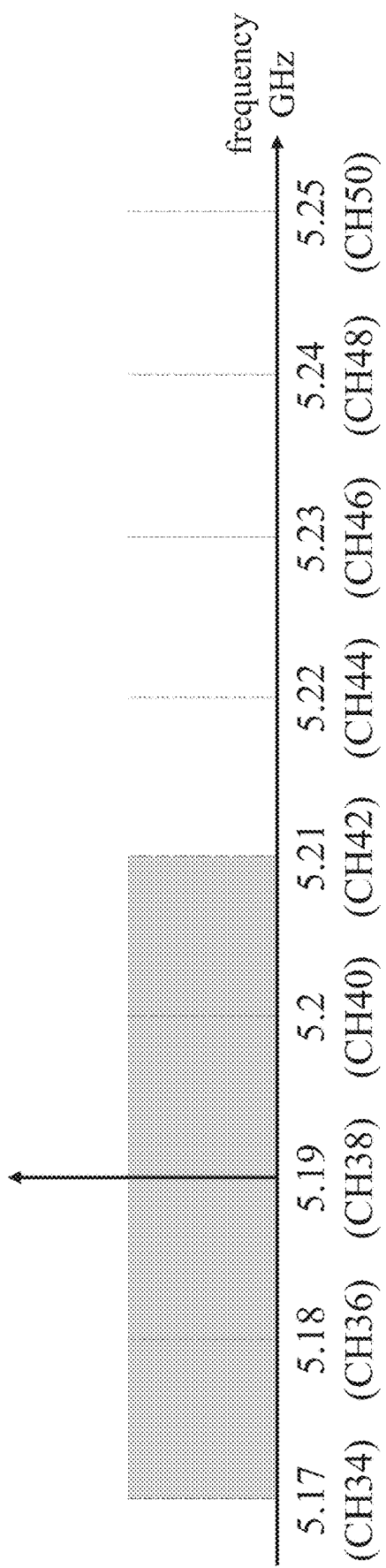
FIG. 5 is a schematic diagram illustrating a band for performing passive scanning of the WiFi station shown in FIG. 4.

According to the 5G specification, the center frequency of each channel is spaced apart by a 10 MHz interval; for example, in FIG. 5, the center frequency of CH34 to CH50 starts from 5.17 GHz and is increased to 5.25 GHz at 10 MHz intervals. When the 5G WiFi station 200 performs the passive scanning, beacons from each channel are detected to receive information about each channel. According to the 5G specification, the bandwidth of WiFi Station 200 can be set as 40 MHz, which is much smaller than the overall channel distribution range, so the beacons for each channel can only be detected separately. In the present embodiment, the application setting is in certain regions which allows an available channel interval of 20 MHz. For example, in FIG. 5, only CH36, CH40, CH44 and CH48 are available.

In the present embodiment, the receiving circuit 204 receives the RF signal drf in the 40 MHz bandwidth to generate the baseband signal din; for example, in the scenario of FIG. 5, the frequency range received by the receiving circuit 204 is between 5.17 GHz and 5.21 GHz (labeled as the gray area); that is, the center frequency of the receiving circuit 204 is 5.19 GHz, corresponding to CH38. As could be seen in FIG. 5, the bandwidth of the receiving circuit 204 further covers CH36 and CH40. Hence, the present application uses the first preamble detection circuit 206 and the second preamble detection circuit 208 to respectively monitor CH36 and CH40, and once a beacon corresponding to CH36 or CH40 is found, the frequency-shifting circuit 212 is notified to perform corresponding band shifting on the baseband signal din to generate a frequency-shifted baseband signal dout, so that the information in the beacon can be better readout by subsequent circuits.

Specifically, the first preamble detection circuit 206 continuously detects whether the beacon in the baseband signal din carries a preamble corresponding to CH36. For example, the first preamble detection circuit 206 uses a set of L-STF sequence corresponding to CH36 to perform cross-correlation computation with the preamble in each beacon carried in the baseband signal din and normalizes the results of the cross-correlation computation according to the signal energy of the current baseband signal din. If a value of the normalized cross-correlation computation is greater than a preset threshold, then it is determined that the beacon corresponds to CH36, and the first preamble detection circuit 206 should immediately notify the frequency-shifting circuit 212 via a signal fg1, so that the frequency-shifting circuit 212 performs −10 MHz band shifting computation on the baseband signal din (shifted down from 5.19 GHz by 10 MHz to 5.18 GHz) to receive data payload in the beacon corresponding to CH36, wherein the frequency-shifting circuit 212 continues the −10 MHz band shifting computation at least until the beacon has been received completely. In contrast, if the beacon does not correspond to CH36, then the frequency-shifting circuit 212 will not be notified to perform −10 MHz band shifting computation.

Similarly, the second preamble detection circuit 208 uses a set of L-STF sequence corresponding to CH40 to determine whether each beacon corresponds to CH40. If yes, then the frequency-shifting circuit 212 is immediately notified via a signal fg2, and the frequency-shifting circuit 212 performs 10 MHz band shifting computation on the baseband signal din (shifted up from 5.19 GHz by 10 MHz to 5.2 GHz) to receive the data payload in the beacon corresponding to CH40, and the frequency-shifting circuit 212 continues the 10 MHz band shifting computation at least until the beacon is received completely.

Figure 6:
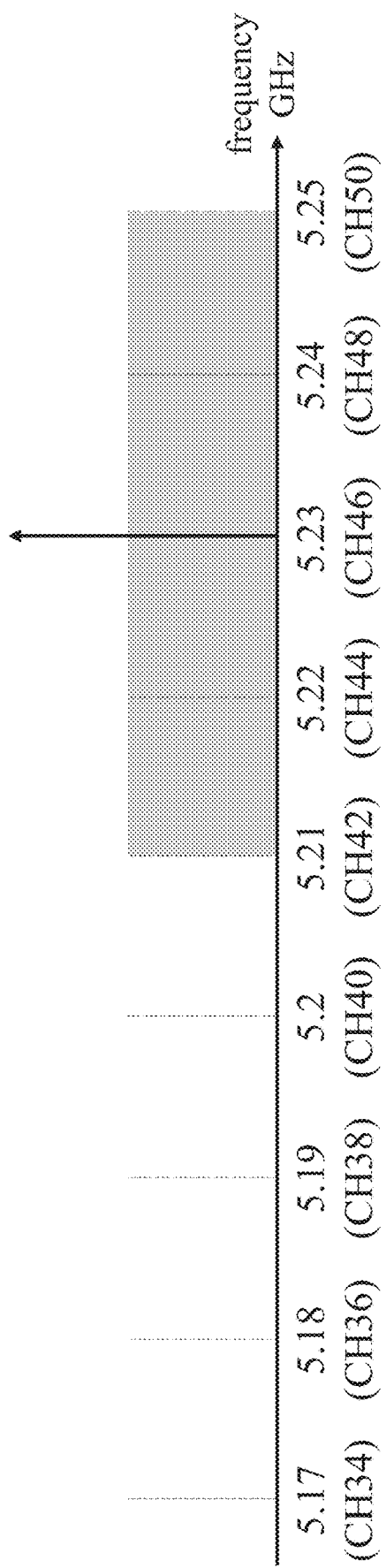
FIG. 6 is a schematic diagram illustrating another band for performing passive scanning of the WiFi station shown in FIG. 4.

The processing circuit 214 uses a control signal cf to control the receiving circuit 204 to use 5.19 GHz as the center frequency to perform the passive scanning, which lasts for a specific period and then move to the next band. As shown in FIG. 6, because the passive scanning of CH36 and CH40 has been completed, during the next specific period, the processing circuit 214 controls the center frequency of the WiFi station 200 to shift up by 40 MHz to 5.23 (the center frequency of CH46), so as to update the 40 MHz band range (labeled as a gray area) of the next specific period, so that it covers CH44 and CH48, to simultaneously detect the beacons of CH44 and CH48. That is, compared to the approach wherein the center frequency for scan is only moved by the distance of one channel (10 MHz) during each specific period, the present application can speed up the passive scanning by moving a distance of multiple channels each time, so that the WiFi station 200 can simultaneously monitor beacons from two channels during a single specific period, thereby reducing the time for the overall passive scanning to as few as one-half of the original time.

other principles for use in the 5G WiFi station 200 are similar to those for use in the 2.4G WiFi station 100; in certain embodiments, the WiFi station 100 and the WiFi station 200 can be combines to perform the passive scanning under 2.4G and 5G simultaneously or sequentially.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of embodiments introduced herein. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A WiFi station, comprising:
a receiving circuit, configured to receive a radio frequency (RF) signal within a specific frequency band to generate a baseband signal during passive scanning, wherein a range of the specific frequency band includes a range of a first channel and a range of a second channel;
a first preamble detection circuit, configured to detect whether the baseband signal has a first preamble corresponding to the first channel and output a first detection result accordingly;
a second preamble detection circuit, configured to detect whether the baseband signal has a second preamble corresponding to the second channel and output a second detection result accordingly;
a frequency-shifting circuit, configured to determine to perform frequency shifting on the baseband signal based on a center frequency of the first channel or a center frequency of the second channel, according to the first detection result and the second detection result, and generate a frequency-shifted baseband signal; and
a processing circuit, wherein when the WiFi station remains in the original specific frequency band for a specific period, the processing circuit updates the specific frequency band,
wherein a center frequency of the specific frequency band is equal to the center frequency of the second channel or is between the center frequency of the first channel and the center frequency of the second channel.

2. The WiFi station of claim 1, wherein the range of the specific frequency band further includes a range of a third channel, and the WiFi station further comprises a third preamble detection circuit, configured to detect whether the baseband signal has a third preamble corresponding to the third channel and output third detection result accordingly; and
the frequency-shifting circuit further determines perform frequency shifting on the baseband signal based on the center frequency of the first channel, the center frequency of the second channel, or the center frequency of the third channel, according to the third detection result, and generates the frequency-shifted baseband signal.

3. The WiFi station of claim 2, wherein the WiFi station performs the passive scanning for the 2.4G channels, a bandwidth of the specific frequency band is 20 MHz, and the center frequency of the second channel is the center frequency of the specific frequency band, the center frequency of the first channel is the frequency at 5 MHz below the center frequency of the specific frequency band, the center frequency of the third channel is the frequency at 5 MHz above the center frequency of the specific frequency band.

4. The WiFi station of claim 3, wherein when the processing circuit updates the specific frequency band, the processing circuit shifts the center frequency of the specific frequency band by 15 MHz.

5. The WiFi station of claim 4, wherein when the WiFi station remains in the original specific frequency band for a specific period, the WiFi station completes scanning the channels in the specific frequency band, and when the scanning of all 2.4G channels is completed, the processing circuit stops updating the specific frequency band and the WiFi station stops performing the passive scanning.

6. The WiFi station of claim 3, wherein:
when the first detection result indicates that the baseband signal has the first preamble corresponding to the first channel, the frequency-shifting circuit performs-5 MHz band shifting on the baseband signal to generate the frequency-shifted baseband signal;
when the second detection result indicates that the baseband signal has the second preamble corresponding to the second channel, the frequency-shifting circuit does not perform band shifting on the baseband signal; and
when the third detection result indicates that the baseband signal has the third preamble corresponding to the third channel, the frequency-shifting circuit performs 5 MHz band shifting on the baseband signal to generate the frequency-shifted baseband signal.

7. The WiFi station of claim 1, wherein the WiFi station performs the passive scanning for 5G channels, wherein the bandwidth of the specific frequency band is 40 MHz, and the center frequency of the first channel is the frequency at 10 MHz below the center frequency of the specific frequency band, and the center frequency of the second channel is the frequency at 10 MHz above the center frequency of the specific frequency band.

8. The WiFi station of claim 7, wherein when the processing circuit updates the specific frequency band, the processing circuit shifts the center frequency of the specific frequency band by 40 MHz.

9. The WiFi station of claim 8, wherein:
when the first detection result indicates that the baseband signal has the first preamble corresponding to the first channel, the frequency-shifting circuit performs-10 MHz band shifting on the baseband signal to generate the frequency-shifted baseband signal; and
when the second detection result indicates that the baseband signal has the second preamble corresponding to the second channel, the frequency-shifting circuit performs 10 MHz band shifting on the baseband signal to generate the frequency-shifted baseband signal.

10. The WiFi station of claim 9, wherein when the WiFi station remains in the original specific frequency band for the specific period, the WiFi station completes scanning of the channels in the specific frequency band, and when the scanning of all 5G channels is completed, the processing circuit stops updating the specific frequency band and the WiFi station stops performing the passive scanning.

11. A passive scanning method for a WiFi station, comprising:
receiving a radio frequency (RF) signal within a specific frequency band to generate a baseband signal, wherein the range of the specific frequency band includes a range of a first channel and a range of a second channel;
detecting whether the baseband signal has a first preamble corresponding to the first channel and outputting a first detection result accordingly;
detecting whether the baseband signal has a second preamble corresponding to the second channel and outputting a second detection result accordingly;
determining to perform frequency shift on the baseband signal based on a center frequency of the first channel or a center frequency of the second channel frequency, according to the first detection result and the second detection result, and generating the frequency-shifted baseband signal; and
updating the specific frequency band when the WiFi station remains in the original specific frequency band for a specific period,
wherein a center frequency of the specific frequency band is equal to the center frequency of the second channel or is between the center frequency of the first channel and the center frequency of the second channel.

12. The method of claim 11, wherein the range of the specific frequency band further includes a range of a third channel the, and the method further comprises:
detecting whether the baseband signal has a third preamble corresponding to the third channel and outputting a third detection result accordingly; and
the step of generating the frequency-shifted baseband signal comprises:
determining to perform band shifting on the baseband signal based on a center frequency of the first channel, a center frequency of the second channel, or a center frequency of the third channel, according to the first detection result, the second detection result, and the third detection result, and generating the frequency-shifted baseband signal.

13. The method of claim 12, wherein 2.4G channels are passively scanned in the method, wherein the bandwidth of the specific frequency band is 20 MHz, the center frequency of the second channel is the center frequency of the specific frequency band, the center frequency of the first channel is the frequency at 5 MHz below the center frequency of the specific frequency band, and the center frequency of the third channel is the frequency at 5 MHz above the center frequency of the specific frequency band.

14. The method of claim 13, wherein the step of updating the specific frequency band comprises:
shifting the center frequency of the specific frequency band by 15 MHz.

15. The method of claim 14, wherein when the WiFi station remains in the original specific frequency band for the specific period, completing scanning the channels in the specific frequency band, when the scanning of all 2.4G channels is completed, stopping updating the specific frequency band and stopping performing the passive scanning.

16. The method of claim 13, wherein the step of generating the frequency-shifted baseband signal comprises:
performing-5 MHz band shifting on the baseband signal to generate the frequency-shifted baseband signal when the first detection result indicates that the baseband signal has the first preamble corresponding to the first channel;
not performing band shifting on the baseband signal when the second detection result indicates that the baseband signal has the second preamble corresponding to the second channel; and
performing 5 MHz band shifting on the baseband signal to generate frequency-shifted baseband signal when the third detection result indicates that the baseband signal has the third preamble corresponding to the third channel.

17. The method of claim 11, wherein 5G channels are passively scanned in the method, wherein the bandwidth of the specific frequency band is 40 MHz, the center frequency of the first channel is the frequency at 10 MHz below the center frequency of the specific frequency band, and the center frequency of the second channel is the frequency at 5 MHz above the center frequency of the specific frequency band.

18. The method of claim 17, wherein the step of updating the specific frequency band comprises:
   shifting the center frequency of the specific frequency band by 40 MHz.

19. The method of claim 18, wherein the step of generating the frequency-shifted baseband signal comprises:
   when the first detection result indicates that the baseband signal has the first preamble corresponding to the first channel, performing-10 MHz band shifting on the baseband signal to generate the frequency-shifted baseband signal; and
   when the second detection result indicates that the baseband signal has the second preamble corresponding to the second channel, performing 10 MHz band shifting on the baseband signal to generate the frequency-shifted baseband signal.

20. The method of claim 19, wherein when the WiFi station remains in the original specific frequency band for the specific period, completing scanning the channels in the specific frequency band, and when the scanning of all 5G channels is completed, stop updating the specific frequency band and stop performing the passive scanning.

\* \* \* \* \*